(12) United States Patent
Porter et al.

(10) Patent No.: US 12,424,099 B1
(45) Date of Patent: Sep. 23, 2025

(54) LANE HAZARD MITIGATION STRATEGY IN ADVANCED DRIVER ASSISTANCE SYSTEM

(71) Applicant: GM GLOBAL TECHNOLOGY OPERATIONS LLC, Detroit, MI (US)

(72) Inventors: Audrey Devin Porter, Warren, MI (US); Kevin A. O'Dea, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 18/611,525

(22) Filed: Mar. 20, 2024

(51) Int. Cl.
*G08G 1/16* (2006.01)
*B60W 30/09* (2012.01)
*G06V 20/58* (2022.01)

(52) U.S. Cl.
CPC ............ *G08G 1/167* (2013.01); *B60W 30/09* (2013.01); *G06V 20/58* (2022.01)

(58) Field of Classification Search
CPC ........ G08G 1/167; B60W 30/09; G06V 20/58
See application file for complete search history.

(56) References Cited

U.S. PATENT DOCUMENTS

| 2013/0085976 | A1* | 4/2013 | Bone ............... B60W 30/18163 706/46 |
| 2021/0284162 | A1* | 9/2021 | Parks ................... G05D 1/0212 |
| 2023/0339471 | A1* | 10/2023 | Kleinschmidt ..... B60W 40/105 |

FOREIGN PATENT DOCUMENTS

| DE | 102014002115 A1 | 8/2015 |
| DE | 102020005763 A1 | 11/2020 |
| DE | 102021103149 A1 | 9/2021 |
| DE | 102020005754 B3 | 12/2021 |
| DE | 102023000072 A1 | 8/2023 |

* cited by examiner

*Primary Examiner* — Tarek Elarabi
(74) *Attorney, Agent, or Firm* — Ingrassia Fisher & Lorenz LLP

(57) ABSTRACT

A lane hazard mitigation algorithm includes a sensor for detecting a first hazard in a host road lane and a second hazard in an adjacent road lane, a processor for determining a host lane mitigation including a host lane speed reduction in response to the first hazard and an adjacent lane mitigation including an adjacent lane speed reduction in response to the second hazard, the processor being further configured to generate a lane change control signal in response to the adjacent lane speed reduction being less than the host lane speed reduction and to generate a vehicle speed reduction control signal in response to the host lane speed reduction being less than the adjacent lane speed reduction, and a vehicle controller for controlling a host vehicle in response to the lane change control signal and the vehicle speed reduction control signal.

19 Claims, 6 Drawing Sheets

LANE HAZARD MITIGATION STRATEGY IN ADVANCED DRIVER ASSISTANCE SYSTEM

INTRODUCTION

The present disclosure relates generally to programming motor vehicle control systems. More specifically, aspects of this disclosure relate to systems, methods and devices to determine a lane hazard mitigation strategy for a plurality of currently available lanes in a roadway and generating a vehicle control plan in response to the least restrictive lane hazard mitigation strategy in an ADAS equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

Adaptive cruise control systems have been developed where not only does the system maintain the set speed, but also will automatically slow the vehicle down in the event that a slower moving preceding vehicle is detected using various sensors, such as radar and cameras. Further, some vehicle systems attempt to maintain the vehicle near the center of a lane on the road. However, maintaining a lane speed on a rough road or roadways with other proximate hazards, such as construction barriers, could cause not only discomfort for vehicle occupants, but also, under some circumstances, the loss of vehicle control.

The conventional implementations of the active safety approaches have been anti-lock braking and traction control systems to help maintain vehicle stability by sensing road conditions and intervening in the vehicle brake and throttle control selections. However, automated driving systems may be helped further by complimenting such control systems with strategies that intervene in vehicle control when hazards are detected within or close to the roadway. It would be desirable to address these problems to provide a method and apparatus for implementing a lane hazard mitigation strategy in an ADAS equipped motor vehicle. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are driver assistance vehicle control systems and methods and related control logic for provisioning vehicle driver assistance vehicle control systems, methods for making and methods for operating such systems, and motor vehicles equipped with driver assistance vehicle control systems. By way of example, and not limitation, there are presented various embodiments of systems for providing a lane hazard mitigation strategy in an ADAS equipped motor vehicle disclosed herein.

In accordance with an exemplary embodiment, a system for performing a lane hazard mitigation algorithm including a sensor for detecting a first hazard in a host road lane and a second hazard in an adjacent road lane, a processor for determining a host lane mitigation including a host lane speed reduction in response to the first hazard and an adjacent lane mitigation including an adjacent lane speed reduction in response to the second hazard, the processor being further configured to generate a lane change control signal in response to the adjacent lane speed reduction being less than the host lane speed reduction and to generate a vehicle speed reduction control signal in response to the host lane speed reduction being less than the adjacent lane speed reduction, and a vehicle controller for controlling a lane change maneuver of a host vehicle from the host road lane to an adjacent lane in response to the lane change control signal and for reducing a host vehicle speed by the host lane speed reduction in response to the vehicle speed reduction control signal.

In accordance with another aspect of the present disclosure wherein the sensor is a vehicle mounted camera and wherein the first hazard and the second hazard are detected in response to an image recognition algorithm performed by the processor.

In accordance with another aspect of the present disclosure wherein at least one of the first hazard and the second hazard includes at least one of a construction zone traffic drum, a construction barrier, a pothole, a rough road surface, a snowy road surface, an icy road surface, a pedestrian, and a stopped vehicle.

In accordance with another aspect of the present disclosure, further including a memory for storing a map data and wherein the sensor is a global navigation satellite system sensor for detecting a host vehicle location and wherein at least one of the first hazard and the second hazard are determined in response to the host vehicle location, the map data, and at least one of a vehicle to vehicle communication and an infrastructure to vehicle communication.

In accordance with another aspect of the present disclosure wherein the adjacent lane speed reduction is proportional to a magnitude of a roughness of the adjacent lane and wherein the host lane speed reduction is proportional to a magnitude of a roughness of the host road lane.

In accordance with another aspect of the present disclosure wherein the vehicle controller is configured to control the lane change maneuver in response to a automatic lane change algorithm being enabled by a host vehicle ADAS controller.

In accordance with another aspect of the present disclosure wherein the sensor is further operative for detecting a third hazard in the host road lane and wherein the host lane speed reduction is determined in response to the greater of a first speed reduction associated with the first hazard or a second speed reduction associated with the third hazard.

In accordance with another aspect of the present disclosure wherein the sensor is a lidar.

In accordance with another aspect of the present disclosure wherein the first hazard is a roughness of the host road lane and wherein the host lane mitigation includes performing a lateral stability operation and wherein the host lane speed reduction is proportional to a magnitude of the roughness of the host road lane.

In accordance with another aspect of the present disclosure, a method for providing a lane hazard mitigation algorithm including detecting, by a sensor, a first hazard in a host vehicle lane and a second hazard in an adjacent vehicle lane, determining a host lane mitigation including a host lane speed reduction in response to the first hazard and an adjacent lane mitigation including an adjacent lane speed reduction in response to the second hazard, generating, by a processor, a lane change control signal in response to the host lane speed reduction being greater than the adjacent lane speed reduction, generating, by the processor, a vehicle speed reduction control signal in response to the adjacent lane speed reduction being greater than the host lane speed reduction, reducing a host vehicle speed within the host vehicle lane, by a vehicle controller, in response to the vehicle speed reduction control signal, and performing, by the vehicle controller, a lane change operation from the host vehicle lane to the adjacent vehicle lane in response to the lane change control signal.

In accordance with another aspect of the present disclosure, including generating a user alert indicative of a lane change operation in response to the lane change control signal on a display within a host vehicle cabin.

In accordance with another aspect of the present disclosure, including generating a user alert indicative of a lane hazard in response to the vehicle speed reduction control signal.

In accordance with another aspect of the present disclosure wherein the first hazard is a rough road surface and wherein the host lane mitigation include performing a vehicle lateral stability algorithm.

In accordance with another aspect of the present disclosure wherein the host lane speed reduction is determined in response to a user preference associated with the first hazard.

In accordance with another aspect of the present disclosure wherein the lane change operation is performed in response to generating a user input indicative of an availability of an adjacent lane having a lower speed reduction and a user confirmation requesting the lane change operation.

In accordance with another aspect of the present disclosure wherein the lane change control signal is generated in response to an adaptive cruise control function being performed by a host vehicle.

In accordance with another aspect of the present disclosure wherein the vehicle speed reduction control signal is generated in response to an adaptive cruise control function being performed by a host vehicle.

In accordance with another aspect of the present disclosure, including generating a user alert indicative of the first hazard in response to a detection of the first hazard and an adaptive cruise control function not being active in a host vehicle.

In accordance with another aspect of the present disclosure, a vehicle control system for performing a driver assistance algorithm including a sensor for detecting a first lane hazard within a host vehicle lane and for detecting a second lane hazard within an adjacent lane, a traction control system configured to detect a roughness magnitude of the host vehicle lane, a processor for determining a host lane mitigation including a host lane speed reduction in response to at least one of the first lane hazard and the roughness magnitude exceeding a threshold value and an adjacent lane mitigation including an adjacent lane speed reduction in response to the second lane hazard, the processor being further configured to generate a lane change control signal in response to the adjacent lane speed reduction being less than the host lane speed reduction and to generate a vehicle speed reduction control signal in response to the host lane speed reduction being less than the adjacent lane speed reduction, and a vehicle controller for controlling a lane change maneuver of a host vehicle in response to the lane change control signal and for reducing a host vehicle speed by the host lane speed reduction in response to the vehicle speed reduction control signal.

In accordance with another aspect of the present disclosure, an image processor for detecting the first lane hazard in response performing an object detection algorithm on a first image and for detection the second lane hazard in response to performing the object detection algorithm on a second image and wherein the sensor is a camera for capturing the first image and the second image and coupling the first image and the second image to the image processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
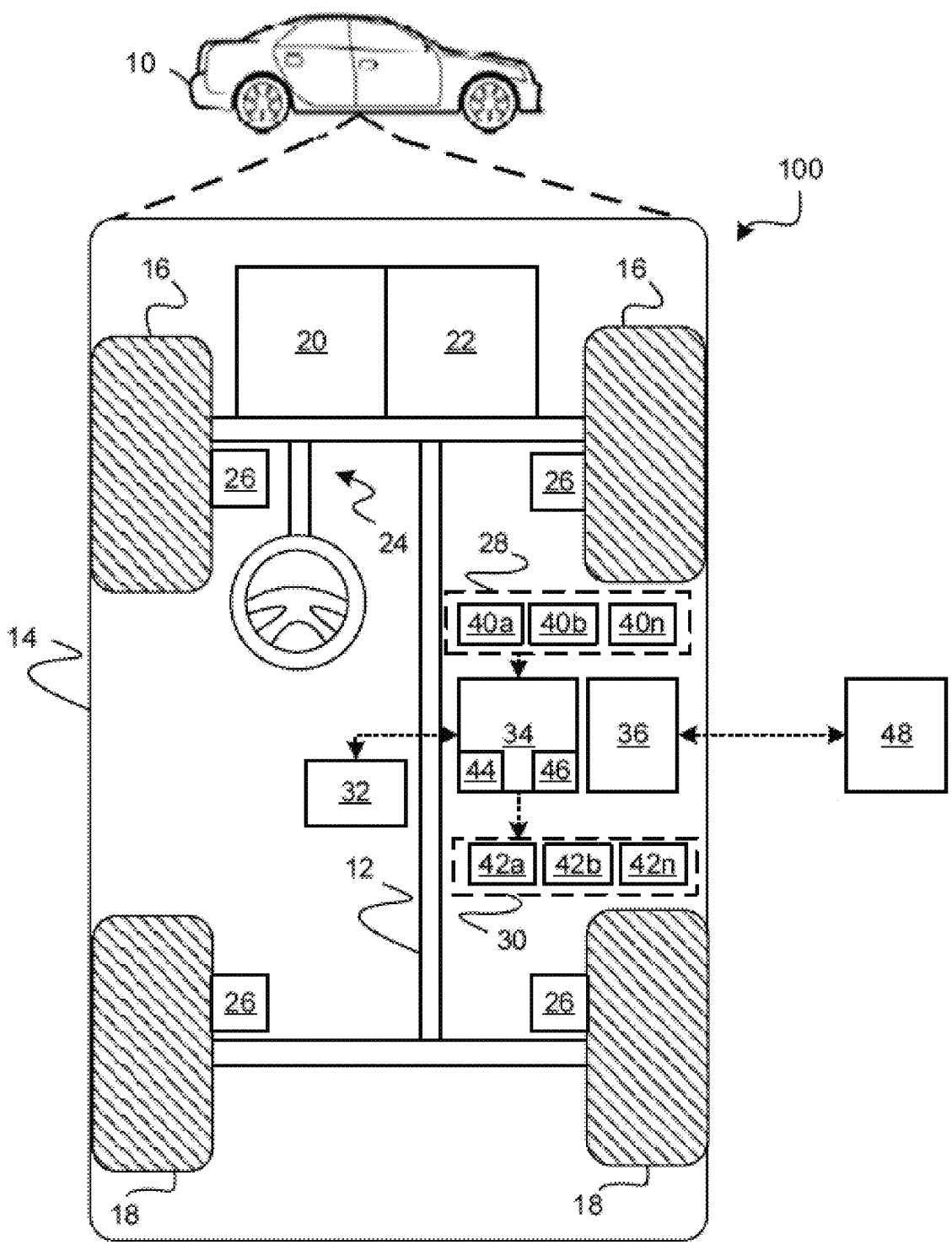
FIG. 1 is a functional block diagram illustrating an ADAS equipped motor vehicle in accordance with various embodiments for implementing a lane hazard mitigation strategy.

FIG. 1 is illustrative of an exemplary operating system 100 for implementing a lane hazard mitigation strategy in an ADAS equipped motor vehicle 10, as described in greater detail further below in connection with the vehicle 10 of FIG. 1 as well as the environment 200 of FIG. 2 and the implementations of FIGS. 3, 4, 5, and 6.

In various embodiments, the vehicle 10 includes an automobile. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 can be an ADAS equipped vehicle having an operating system 100 for implementing a lane hazard mitigation strategy incorporated into the vehicle 10 (hereinafter referred to as the vehicle 10). The vehicle 10 is, for example, a vehicle that can be automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is autonomous in that it provides partial or full automated assistance to a driver operating the vehicle 10. As used herein the term operator is inclusive of a driver of the vehicle 10 and/or an autonomous driving system of the vehicle 10.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
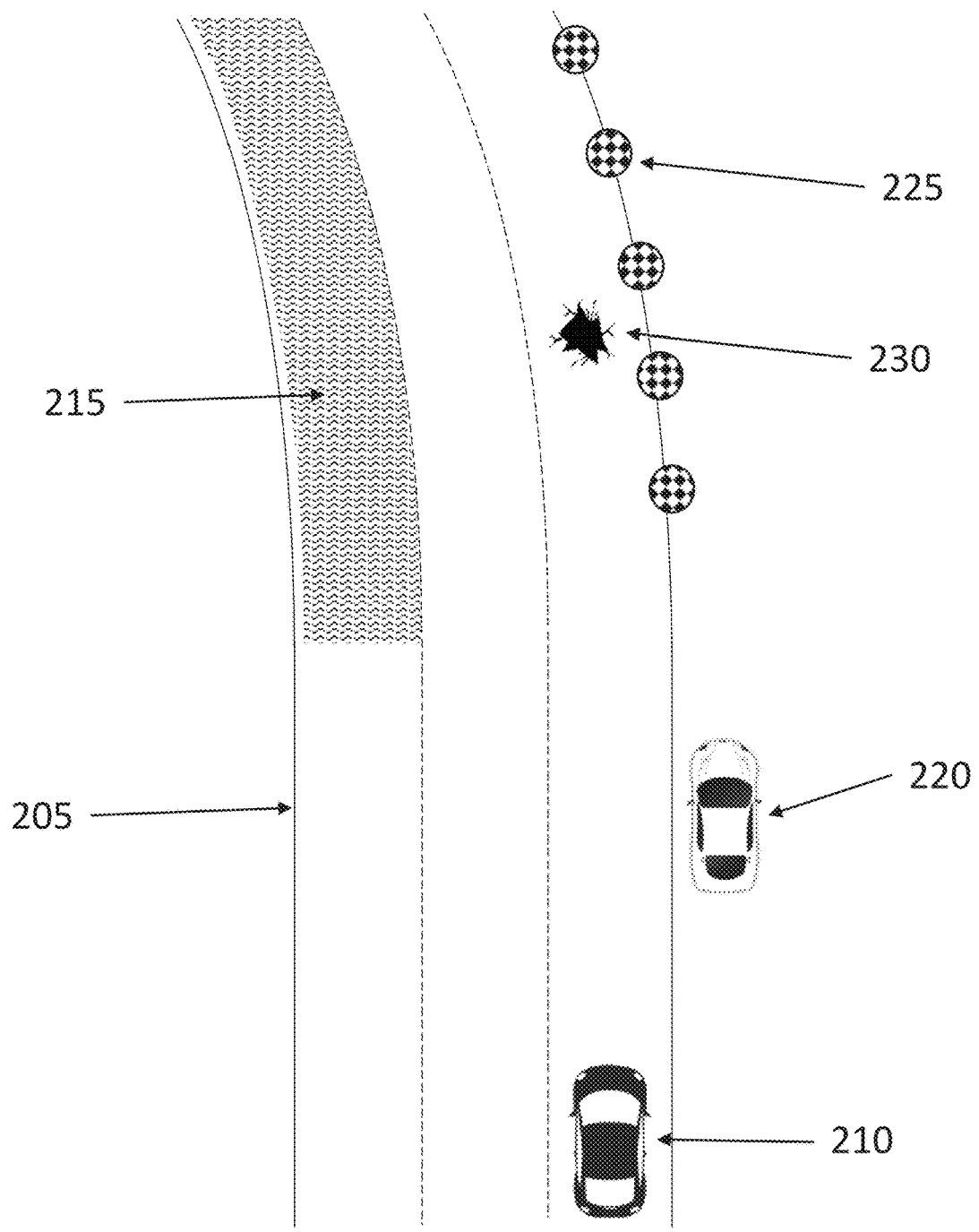
FIG. 2 is illustrative of an exemplary operating environment for implementing a lane hazard mitigation strategy in an ADAS equipped motor vehicle according to an exemplary embodiment of the present disclosure.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate by communication messages over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the quality and safety assessing system 100 and, when executed by the processor 44, process sensor data from the sensing devices 40*a*-40*n*, message data from the communication medium and/or communication system 36, and/or data sent to or received from the actuator devices 42*a*-42*n*, and compute scores and explanations about the safety and driving quality of the operator of the vehicle 10.

Turning now to FIG. 2, an exemplary operating environment 200 for a lane hazard mitigation strategy in an ADAS equipped motor vehicle 210 is shown. In this exemplary embodiment of the present disclosure, the host vehicle 210 is driving on a multilane roadway 205 having various hazards such as a proximate vehicle 220, rough road segments 215, construction barrels 225, and potholes 230.

In some exemplary embodiments, the host vehicle 210 is equipped with an ADAS feature such as adaptive cruise control and automatic lane centering. During assisted driving operation, the ADAS controller controls the throttle, the brakes and the steering of the host vehicle 210 to control the vehicle speed and vehicle position to keep the host vehicle 210 within the laneway. The ADAS controller can be configured to maintain a constant speed, to detect proximate objects, such as an approach to a slow preceding vehicle within the laneway, and to reduce a vehicle speed appropriately. Likewise, the ADAS controller can keep the host vehicle 210 centered in the current laneway and control the steering to change the host vehicle 210 position within the laneway in response to detected hazards, such as debris or the like. When the ADAS is active, the ADAS can further perform a lane hazard mitigation algorithm to reduce a host vehicle speed in response to detected hazards within, or proximate to, the multilane roadway 205.

For each detected drivable lane, the lane hazard mitigation algorithm can calculate a lane hazard mitigation speed, which is a function of driver preferences, detected lane hazards, detected hazard speed limit signs as well as vehicle handling and occupant comfort considerations. In response to detected lane hazards, driver preferences and available lateral control, the lane hazard mitigation algorithm can reduce the vehicle speed to the hazard mitigation speed of the host lane and apply some lateral stabilization if on a rough road. Simultaneously, the lane hazard mitigation algorithm can determine availability of a less hazardous adjacent lane having a higher hazard mitigation speed.

The problem of decreased handling performance and ride comfort on rough lanes while utilizing an ADAS feature can be mitigated by the lane hazard mitigation algorithm that can be configured to reduce a vehicle speed in response to detected lane hazards, to apply vehicle lateral stabilizing functions, and to move the host vehicle 210 to a less hazardous adjacent lane if one is detected and available. Hazards such as construction barrels 225 and/or construction barriers, workers, pedestrians, disabled vehicles, emergency vehicles or other stopped vehicles 220 on either side of a lane are addressed by the lane hazard mitigation algorithm by determining an appropriate lane speed for each hazard, reducing the host vehicle speed to the slowest appropriate lane speed, and/or navigating the host vehicle 210 to a lane with the highest appropriate lane speed. In some exemplary embodiments, the appropriate lane speed for each type of hazard can be configured by a vehicle operator or can be configured in response to determined user preferences based on past driver actions associated with each type of hazard. These driver actions can include lane changes, braking, vehicle speed, lane position and the like. In some exemplary embodiments, driver preferences for interaction with common lane hazards can be assigned as a percentage speed reduction from a posted lane speed for each hazard. Quantifying detected hazards for each lane can be performed by calculating the speed reduction for each hazard present and choosing the maximum speed reduction or vehicle speed.

Figure 3:
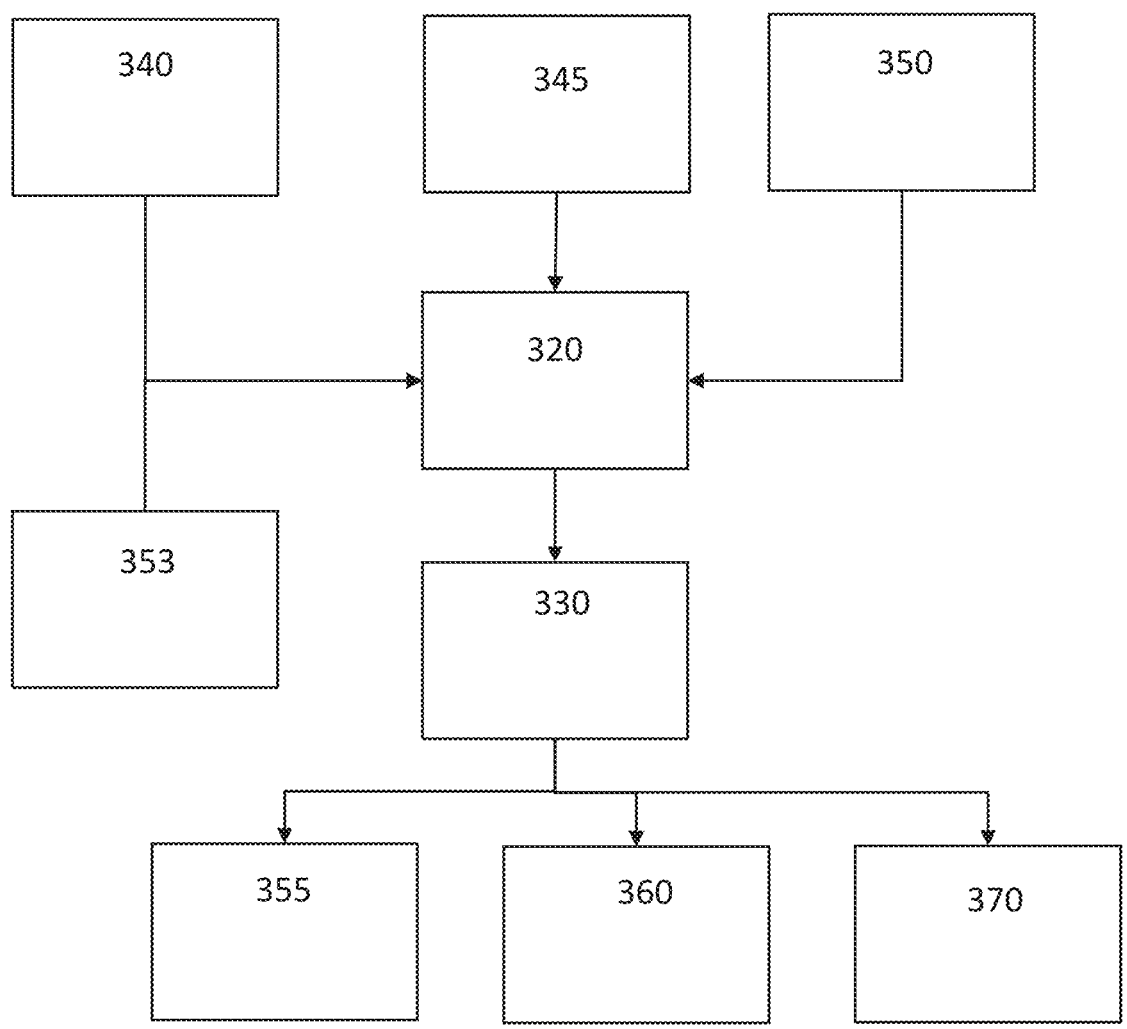
FIG. 3 shows a block diagram of an exemplary system for providing a lane hazard mitigation strategy in an ADAS equipped motor vehicle according to an exemplary embodiment of the present disclosure.

Turning now to FIG. 3, a block diagram illustrating an exemplary implementation of a system 300 for performing a lane hazard mitigation strategy in an ADAS equipped motor vehicle is shown. The exemplary system 300 can include a processor 320, a camera 240 and a GPS sensor 345. In addition, the processor 320 may receive information such as map data 350 from a memory or the like, and user input via a user interface 353.

The camera 340 may be a low fidelity camera with a forward field of view (FOV). The camera 340 may be mounted inside the vehicle behind the rear view mirror or may be mounted on the front fascia of the vehicle. The camera 340 may use captured images and/or video which can be used to detect preceding and proximate vehicles, obstacles, lane markers, road surface edges, road surface characteristics, other roadway markings and road hazards during ADAS operation. Images captured by the camera 340 and data generated from the images may be used to augment map data stored in the memory 350.

The GPS sensor 345 can be a part of a global navigation satellite system (GNSS) to receive a plurality of time stamped satellite signals including the location data of a transmitting satellite. The GPS controller then uses this information to determine a precise location of the GPS sensor 345. The processor 320 may be operative to receive the location data from the GPS controller and store this location data to the memory 350. The memory 350 may be operative to store map data for use by the processor 320. The memory 350 may be further operative to store map data wherein the map data may be high definition map data including detailed representations of roadways including precise roadway locations, lane locations, curves, elevations, known lane hazards and other roadway details.

The processor 320 is operative to engage and control the ADAS in response to an initiation of the ADAS from a user via the user interface 353. In an ADAS operation, the processor 320 may be operative to generate a desired path in response to a user input or the like, wherein the desired path may include lane centering, curve following, lane changes, etc. This desired path information may be determined in response to the vehicle speed, the yaw angle and the lateral position of the vehicle within the lane. Once the desired path is determined, a control signal is generated by the processor 320 indicative of the desired path and is coupled to the vehicle controller 330. The vehicle controller 330 is operative to receive the control signal and to generate an individual steering control signal to couple to the steering controller 370, a braking control signal to couple to the brake controller 360 and a throttle control signal to couple to the throttle controller 355 in order to execute the desired path.

According to an exemplary embodiment, the processor 320 is further operative to perform a lane hazard mitigation algorithm. The processor 320 can first receive data from the various sensors, map data from the memory 350, and telemetric data from the vehicle controller 330. In response to the received data, the processor 320 can next determine the location of various lane hazards, such as rough roads, obstacles, or objects proximate to the roadway lanes. The processor 320 next determines a lane hazard mitigation for each of the available roadway lanes. Lane hazard mitigations can include reducing speed, adjusting lateral position in the laneway, activation of traction control algorithms such as suspension stiffening, and the like. The processor 320 next determines which of the available roadway lanes has the least restrictive lane hazard mitigation and then presents an indication of this roadway lane having the least restrictive lane hazard mitigation to a driver. In some exemplary embodiments, such as when a lane change algorithm is enabled in the ADAS algorithm, the processor 320 can generate a control signal to couple to the vehicle controller 330 to execute a lane change operation from the current vehicle lane to the roadway lane having the least restrictive lane hazard mitigation.

Figure 4:
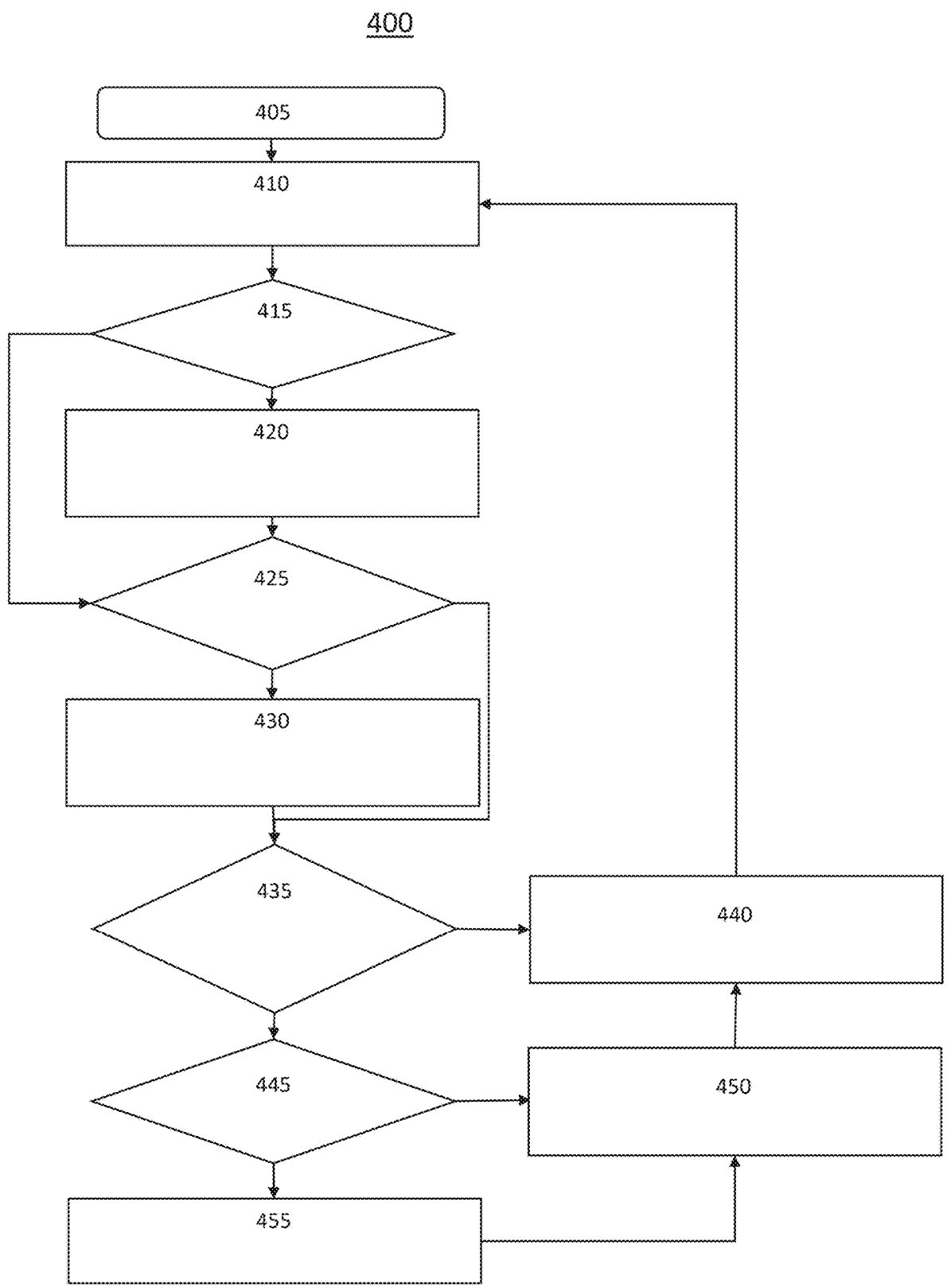
FIG. 4 shows a flow chart illustrating a method for providing a lane hazard mitigation strategy in an ADAS equipped motor vehicle according to an exemplary embodiment of the present disclosure.

Turning now to FIG. 4, a flow chart illustrating an exemplary implementation of a method 400 for performing a lane hazard mitigation strategy in an ADAS equipped motor vehicle is shown. The method 400 is first operative to initiate 405 the lane hazard mitigation algorithm. The lane hazard mitigation algorithm can be initiated in response to an activation of a vehicle ADAS system, such as in response to a user activation via a user interface, in response to a detection of the vehicle entering a predefined geographic area, or in response to an emergency takeover of a vehicle control system by the ADAS controller, or the like. In some exemplary embodiments, the lane hazard mitigation algorithm is activated anytime an adaptive cruise control feature is engaged.

In response to initiation of the lane hazard mitigation algorithm, the method 400 is next operative to detect objects 410 within the vehicle host lane and other proximate areas such as adjacent lanes, road shoulders and the like. These objects can include dynamic objects, such as proximate vehicles travelling within the roadway, and static objects, such as debris or obstacles in the roadway, disabled or stopped vehicles on a road shoulder or lane, construction barriers, construction pylons or barrels, roadway surface features, such as potholes, curbs, ice, snow and rough road segments. In some exemplary embodiments, the static objects can be mapped to a coordinate system referenced to the host vehicle. In addition, lane markers, and other roadway indicators can be mapped to the coordinate system.

In response to detecting the objects and roadway features proximate to the host vehicle, the method 400 next determines if any of the objects are lane hazards 415. Lane hazards can include any object that poses a challenge to ADAS control systems including perception, planning, and decision-making systems, potentially leading to accidents or unsafe situations. In addition, lane hazards can include objects proximate to the vehicle lane which may cause discomfort for vehicle occupants. For example, construction barrels lining the side of a lane may not pose a significant hazard for an ADAS control system, but may make the vehicle occupant uncomfortable or nervous under which the human driver would reduce the speed of the vehicle or adjust the position of the vehicle within the lane, such as moving away from barrels in the lane.

If any of the detected objects are determined to be lane hazards, the method 400 next applies 420 a lane hazard mitigation for the host lane. The lane hazard mitigation can be a mitigation associated with the particular type of lane hazard. For example, entering a construction zone can have a vehicle speed mitigation of 20% reduction from the posted speed. Approaching construction barrels lining one side of the host lane can have a vehicle speed mitigation of 15% reduction from the current vehicle speed and a shift of the lateral position of the host vehicle within the host lane of 10% from the lane center away from the construction barrels. In some exemplary embodiments, these lane hazard mitigations can be factory default values, can be user selected mitigation values, or can be recognized from previous driver reactions to encountering the particular type of lane hazard. In some exemplary embodiments, the lane hazard mitigation can be a regulated mitigation associated with traffic laws for the current location. For example, a construction zone may require a maximum speed of 35 miles per hour, so the lane hazard mitigation for a detection of a construction zone is a host vehicle speed reduction from the current speed to 35 miles per hour. The description of FIG. 6 further discusses a method 600 for establishing a lane hazard mitigation for a lane hazard mitigation strategy.

Once the lane hazard mitigation is applied or if no objects are determined to be lane hazards, the method 400 next determines if the host road surface is a rough road 425. Rough road conditions can be determined in response to host vehicle traction control data, vehicle controller, accelerometer, camera data, map data, etc. The traction control system can determine a roughness of a host lane in response to wheel slip information indicative of slipping of one or more of the vehicle wheels indicating low traction. In addition, accelerometer data can be indicative of lateral and vertical acceleration of the host vehicle and/or the host vehicle suspension systems. The vehicle controller can then determine a roughness of the road in response to the magnitudes of these accelerations. In some exemplary embodiments, road roughness can be determined in response to map data, data sourced from other vehicles indicating a rough road or upcoming rough road conditions, or data received via a wireless network from a data source to the host vehicle. The description of FIG. 5 further discusses a method 500 for establishing a lane hazard mitigation for a rough road in a lane hazard mitigation strategy In response to the determined roughness of the road, the method can then apply 430 a lateral rough road mitigation. Rough road mitigations can include reduced host vehicle speed, reduced engine power to the slipping wheels or to all of the wheels, application of brakes to reduce slipping and to reduce host vehicle speed. In some exemplary embodiments, the magnitude of the rough road mitigation can be proportional to the magnitude of the roughness of the road. For example, if the road is minimally rough, such as grooved asphalt, the rough road mitigation can be less than if the road is very rough, such as a gravel road with excessive washboarding.

Once the rough road lane hazard mitigation is applied or if the host lane has not been determined to be rough, the method 400 next calculates lane hazard mitigations for each of the adjacent lanes. In some exemplary embodiments, lane hazard mitigations are calculated for every available lane in the roadway. The lane hazard mitigation for adjacent lanes involves determining lane hazard mitigations for any lane hazard in each adjacent lane and a rough road mitigation for each adjacent lane. The most restrictive mitigation for an adjacent lane is then designated as the mitigation for that lane. The method 400 next determines in response to the most restrictive mitigation for the host lane and the most restrictive mitigation for each of the adjacent lanes if there is a greater mitigation speed, or a less restrictive mitigation, in any adjacent lane 435. If there is no greater mitigation speed in an adjacent lane, or less restrictive mitigation, the method next alerts 440 the driver to the lane hazard for the host lane and returns to detecting proximate objects 410.

If there is a greater mitigation speed in an adjacent lane, the method 400 next determines if a lane change algorithm is enabled 445 by the ADAS system. If a lane change algorithm is not enabled, the method 400 alerts the driver to the lane with the highest mitigation speed 450, alerts 440 the driver to the lane hazard for the host lane, and returns to detecting proximate objects 410.

If a lane change algorithm is enabled, such as an automatic lane change algorithm or the like, the method 400 next navigates the host vehicle to the adjacent lane with the highest mitigation speed 455. After performance of the lane change operation, the adjacent lane becomes the current lane for the host vehicle. The method 400 can then alert the driver to the higher mitigation speed in the current lane 450, can alert 440 the driver of the lane hazard in the current lane, and returns to detecting proximate objects 410.

Figure 5:
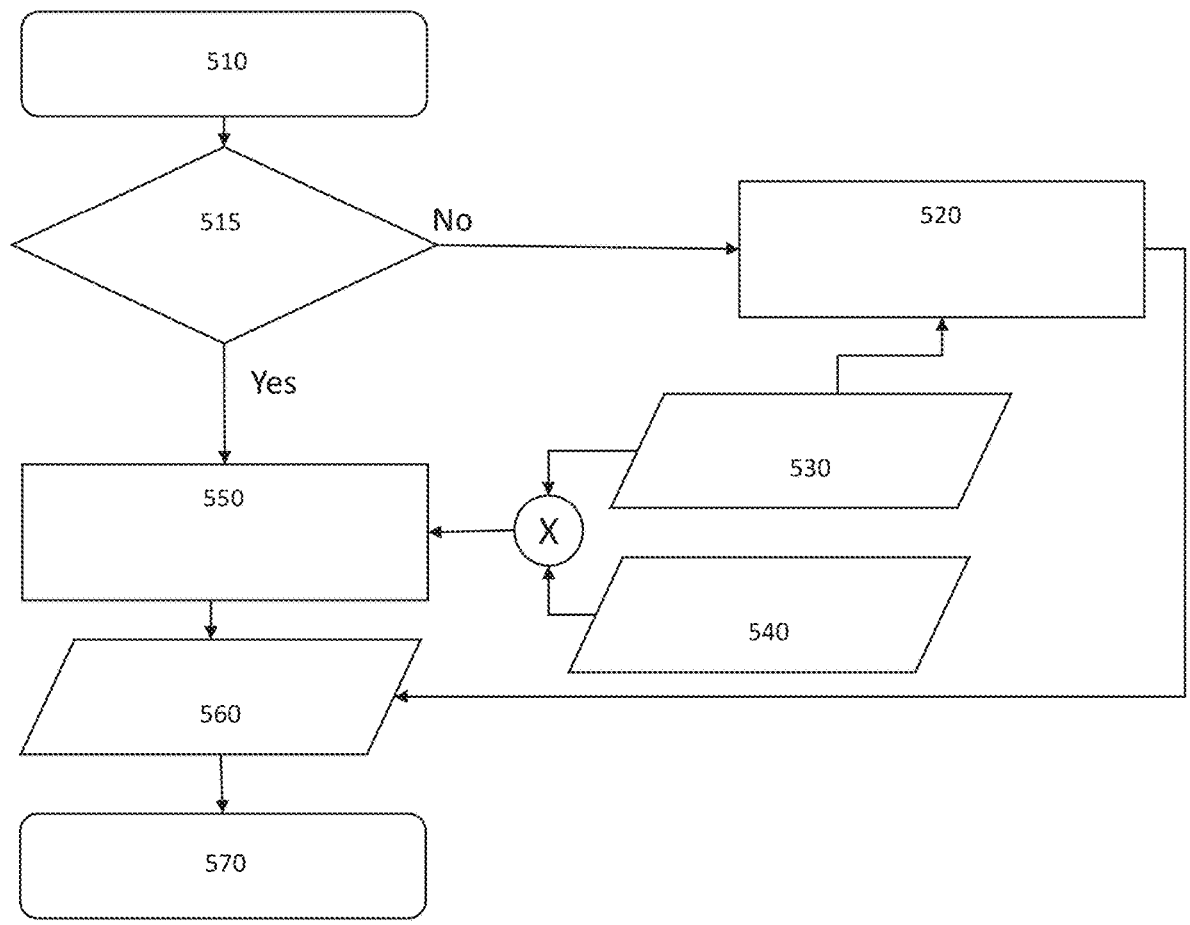
FIG. 5 shows another flow chart illustrating a method for providing a lane hazard mitigation strategy in an ADAS equipped motor vehicle according to an exemplary embodiment of the present disclosure.

Turning now to FIG. 5, a flow chart illustrating an exemplary implementation of a method 500 for employing a lane hazard mitigation for a rough road in an ADAS equipped motor vehicle is shown. In some exemplary embodiments, the method 500 is first initiated 510 in response to a call, such as a subroutine call or the like, from the lane hazard mitigation algorithm and/or an ADAS control algorithm. The method 500 then determines if a current road surface is a rough road surface 515. The lane can be determined to be a rough road surface in response to vehicle dynamics data, such as accelerometer data indicative of lateral and vertical acceleration, can be determined in response to steering system torque, traction control information indicative of wheel slip and/or wheel speed. In addition, rough road surfaces can be determined in response to map data stored in a vehicle memory, data received via vehicle to vehicle (V2V) communications systems from other vehicles, or from data received via infrastructure to vehicle (I2V) communications systems. In some exemplary embodiments, rough roads can include wet, snowy, or sandy roads or other road surfaces where traction is reduced by weather conditions or other debris.

If the lane is not determined to be rough, the ADAS system sets the lane speed to either the current system speed 520 or the current posted speed limit for the current roadway and/or lane, or can be a user defined lane speed. The method 500 then sets the vehicle speed 560 to the system speed and the rough road mitigation algorithm is complete 570.

If a rough road is detected 515, the method then determines 540 a system speed percent reduction for the rough road. In some exemplary embodiments, the system speed percent reduction can be proportional to the magnitude of the road roughness. For example, a road with a lower magnitude roughness would have a lower system speed percent reduction than a road with a higher magnitude of roughness. In some exemplary embodiments, the roughness can be determined in response to an amount of wheel slip detected by the host vehicle. The system set speed 530 is multiplied by the system speed percent reduction for the rough road resulting in the vehicle lane speed for the rough road 550. The vehicle speed 560 for the host vehicle is next set to the vehicle lane speed for the rough road and the rough road mitigation algorithm is complete 570.

Figure 6:
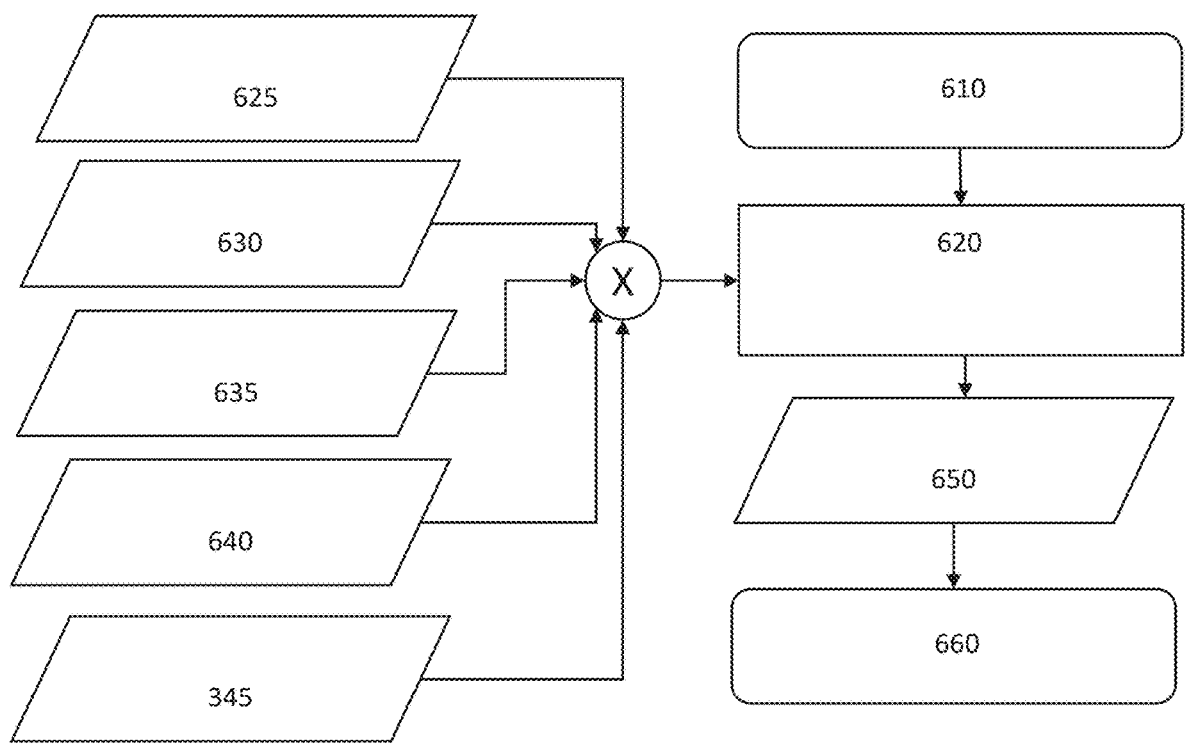
FIG. 6 shows another flow chart illustrating a method for providing for providing a lane hazard mitigation strategy in an ADAS equipped motor vehicle according to an exemplary embodiment of the present disclosure.

Turning now to FIG. 6, a flow chart illustrating an exemplary implementation of a method 600 for establishing a lane hazard mitigation speed for a lane hazard mitigation strategy in an ADAS equipped motor vehicle is shown. In some exemplary embodiments, the method 600 is first initiated 610 in response to a call, such as a subroutine call or the like, from the lane hazard mitigation algorithm and/or an ADAS control algorithm. The method 600 is next configured to select a lowest mitigation speed 620 from a plurality of mitigation speed corresponding to different detected lane hazards and/or rough lane conditions. The plurality of mitigation speeds can include a construction barrel mitigation speed 625, a construction barrier mitigation speed 630, a person or vehicle on the shoulder of the roadway mitigation speed 635, a rough road mitigation speed 640 and/or a construction zone mitigation speed 345. Each of the plurality of mitigation speeds is only considered as the lowest mitigation speed if that particular hazard or condition has been detected within, or proximate to, the host lane for the host vehicle. When the lowest mitigation speed for each of the detected hazards is determined, the vehicle speed is set to the lowest mitigation speed 650 and the lane hazard mitigation speed algorithm is complete 660.

It will be appreciated that the systems, vehicles, and methods may vary from those depicted in the Figures and described herein. For example, the vehicle 10 of FIG. 1, the control system and a lane hazard mitigation control system thereof, and/or components thereof of FIG. 1 may vary in different embodiments. It will similarly be appreciated that the steps of the processes 400, 500 and 600 may differ from that depicted in FIG. 2, and/or that various steps of the process 200 may occur concurrently and/or in a different order than that depicted in of FIG. 4, FIG. 5, and FIG. 6 respectively. It will also be appreciated that the implementations of FIGS. 1, 2, and 3 may also vary in different embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for performing a lane hazard mitigation algorithm comprising:
   a sensor for detecting a first hazard in a host road lane and a second hazard in an adjacent road lane;
   a processor for determining a host lane mitigation including a host lane speed reduction in response to the first hazard, wherein the host lane speed reduction is proportional to a magnitude of a roughness of the host road lane, and an adjacent lane mitigation including an adjacent lane speed reduction in response to the second hazard, wherein the adjacent lane speed reduction is proportional to a magnitude of a roughness of the adjacent road lane; the processor being further configured to generate a lane change control signal in response to the adjacent lane speed reduction being less than the host lane speed reduction and to generate a vehicle speed reduction control signal in response to the host lane speed reduction being less than the adjacent lane speed reduction; and
   a vehicle controller for controlling a lane change maneuver of a host vehicle from the host road lane to the adjacent road lane in response to the lane change control signal and for reducing a host vehicle speed by the host lane speed reduction in response to the vehicle speed reduction control signal.

2. The system for performing a lane hazard mitigation algorithm of claim 1 wherein the sensor is a vehicle mounted camera and wherein the first hazard and the second hazard are detected in response to an image recognition algorithm performed by the processor.

3. The system for performing a lane hazard mitigation algorithm of claim 1 wherein at least one of the first hazard and the second hazard includes at least one of a construction zone traffic drum, a construction barrier, a pothole, a rough road surface, a snowy road surface, an icy road surface, a pedestrian, and a stopped vehicle.

4. The system for performing a lane hazard mitigation algorithm of claim 1 further including a memory for storing a map data and wherein the sensor is a global navigation satellite system sensor for detecting a host vehicle location and wherein at least one of the first hazard and the second hazard are determined in response to the host vehicle location, the map data, and at least one of a vehicle to vehicle communication and an infrastructure to vehicle communication.

5. The system for performing a lane hazard mitigation algorithm of claim 1 wherein the vehicle controller is configured to control the lane change maneuver in response to an automatic lane change algorithm being enabled by a host vehicle ADAS controller.

6. The system for performing a lane hazard mitigation algorithm of claim 1 wherein the sensor is further operative for detecting a third hazard in the host road lane and wherein the host lane speed reduction is determined in response to the greater of a first speed reduction associated with the first hazard or a second speed reduction associated with the third hazard.

7. The system for performing a lane hazard mitigation algorithm of claim 1 wherein the sensor is a lidar.

8. The system for performing a lane hazard mitigation algorithm of claim 1 wherein the first hazard is a roughness of the host road lane and wherein the host lane mitigation includes performing a lateral stability operation.

9. A method for providing a lane hazard mitigation algorithm comprising:
 detecting, by a sensor, a first hazard in a host vehicle lane and a second hazard in an adjacent vehicle lane;
 determining a host lane mitigation including a host lane speed reduction in response to the first hazard, wherein the host lane speed reduction is proportional to a magnitude of a roughness of the host vehicle lane, and an adjacent lane mitigation including an adjacent lane speed reduction in response to the second hazard, wherein the adjacent lane speed reduction is proportional to a magnitude of a roughness of the adjacent vehicle lane;
 generating, by a processor, a lane change control signal in response to the host lane speed reduction being greater than the adjacent lane speed reduction;
 generating, by the processor, a vehicle speed reduction control signal in response to the adjacent lane speed reduction being greater than the host lane speed reduction;
 reducing a host vehicle speed within the host vehicle lane, by a vehicle controller, in response to the vehicle speed reduction control signal; and
 performing, by the vehicle controller, a lane change operation from the host vehicle lane to the adjacent vehicle lane in response to the lane change control signal.

10. The method for providing a lane hazard mitigation algorithm of claim 9 further including generating a user alert indicative of a lane change operation in response to the lane change control signal on a display within a host vehicle cabin.

11. The method for providing a lane hazard mitigation algorithm of claim 9 further including generating a user alert indicative of a lane hazard in response to the vehicle speed reduction control signal.

12. The method for providing a lane hazard mitigation algorithm of claim 9 wherein the first hazard is a rough road surface and wherein the host lane mitigation include performing a vehicle lateral stability algorithm.

13. The method for providing a lane hazard mitigation algorithm of claim 9 wherein the host lane speed reduction is determined in response to a user preference associated with the first hazard.

14. The method for providing a lane hazard mitigation algorithm of claim 9 wherein the lane change operation is performed in response to generating a user input indicative of an availability of an adjacent lane having a lower speed reduction and a user confirmation requesting the lane change operation.

15. The method for providing a lane hazard mitigation algorithm of claim 9 wherein the lane change control signal is generated in response to an adaptive cruise control function being performed by a host vehicle.

16. The method for providing a lane hazard mitigation algorithm of claim 9 wherein the vehicle speed reduction control signal is generated in response to an adaptive cruise control function being performed by a host vehicle.

17. The method for providing a lane hazard mitigation algorithm of claim 9 further including generating a user alert indicative of the first hazard in response to a detection of the first hazard and an adaptive cruise control function not being active in a host vehicle.

18. A vehicle control system for performing a driver assistance algorithm comprising:
 a sensor for detecting a first lane hazard within a host vehicle lane and for detecting a second lane hazard within an adjacent lane;
 a traction control system configured to detect a roughness magnitude of the host vehicle lane and a roughness magnitude of the adjacent lane;
 a processor for determining a host lane mitigation including a host lane speed reduction in response to at least one of the first lane hazard, wherein the host lane speed reduction is proportional to the roughness magnitude of the host vehicle lane and the roughness magnitude exceeding a threshold value, and an adjacent lane mitigation including an adjacent lane speed reduction in response to the second lane hazard, wherein the adjacent lane speed reduction is proportional to the roughness magnitude of the adjacent lane; the processor being further configured to generate a lane change control signal in response to the adjacent lane speed reduction being less than the host lane speed reduction and to generate a vehicle speed reduction control signal in response to the host lane speed reduction being less than the adjacent lane speed reduction; and
 a vehicle controller for controlling a lane change maneuver of a host vehicle in response to the lane change control signal and for reducing a host vehicle speed by the host lane speed reduction in response to the vehicle speed reduction control signal.

19. The vehicle control system for performing a driver assistance algorithm of claim 18, further including:
 an image processor for detecting the first lane hazard in response performing an object detection algorithm on a first image and for detection the second lane hazard in response to performing the object detection algorithm on a second image and wherein the sensor is a camera for capturing the first image and the second image and coupling the first image and the second image to the image processor.

\* \* \* \* \*